United States Patent

Urano et al.

[11] 4,164,369
[45] Aug. 14, 1979

[54] DIOPTER-ADJUSTING DEVICE FOR USE IN FINDER-INTERCHANGEABLE TYPE SINGLE LENS REFLEX CAMERA

[75] Inventors: Fumio Urano, Omiya; Norimichi Takahashi, Tokyo, both of Japan

[73] Assignee: Asahi Kogaku Kogyo Kabushiki Kaisha, Tokyo, Japan

[21] Appl. No.: 912,145

[22] Filed: Jun. 2, 1978

[30] Foreign Application Priority Data

Jun. 2, 1977 [JP] Japan ..................... 52-65049

[51] Int. Cl.² ............................................. G03B 13/06
[52] U.S. Cl. .................................. 354/219; 354/155; 350/255
[58] Field of Search ............... 354/219, 155, 222, 223, 354/220, 221, 224, 225, 166; 350/255, 46, 47

[56] References Cited

U.S. PATENT DOCUMENTS

| | | | |
|---|---|---|---|
| 1,267,596 | 5/1918 | Schleinzer | 350/255 |
| 2,584,912 | 2/1952 | Palmer | 354/219 |
| 3,250,176 | 5/1966 | Dowling et al. | 350/47 X |
| 3,630,133 | 12/1971 | Shimomura | 354/155 |
| 3,967,299 | 6/1976 | Shono | 354/219 |

Primary Examiner—Joseph W. Hartary
Assistant Examiner—Shelley Wade
Attorney, Agent, or Firm—Sughrue, Rothwell, Mion, Zinn and Macpeak

[57] ABSTRACT

The eyepiece in an interchangeable finder is made axially adjustable by mounting it in a holder which, in turn, is slidably mounted within the finder. In the preferred embodiment, sliding movement of the eyepiece holder is accomplished through a rack and pinion.

2 Claims, 3 Drawing Figures

DIOPTER-ADJUSTING DEVICE FOR USE IN FINDER-INTERCHANGEABLE TYPE SINGLE LENS REFLEX CAMERA

BACKGROUND OF THE INVENTION

This invention relates to a diopter-adjusting device for use in a finder-interchangeable type single reflex camera.

Various types of cameras incorporating the diopter-adjusting devices are known. However, these cameras generally suffer from the shortcoming that an operating member for adjusting a diopter is exposed to the exterior of the camera so that there is a danger of the operating member being operated inadvertently. To cope with this, it has been proposed to incorporate a locking means in the operating member to prevent the aforenoted inadvertent operation. However, the diopter adjustment is not operated as often as, for example, the focus adjustment for an objective lens, so that it is preferable that the diopter-adjusting-operating member be positioned in a concealed condition from the exterior of a camera.

With the interchangeable-finder type single lens reflex camera, wherein a finder is mounted on the body of the camera, if the diopter-adjusting-operating member is positioned so as to be concealed from the exterior of a camera then there is no danger of hands or other objects contacting the diopter-adjusting-operating member upon taking a picture or handling of the camera, thereby precluding a variation in the diopter or dioptic power.

Meanwhile, the interchangeable-finder type single lens reflex cameras are no exception to the general rule that many parts should be positioned in a small space in a camera body. Thus, the sizes of respective parts are designed to be as small as possible without impairing their functions. This is also true with an eyepiece and, therefore, the portion of the eyepiece lens through which light is not transmitted is cut away so that the configuration of the eyepiece is not cylindrical but rectangular. It has been a general practice to adopt a helicoid i.e., the rotating movement moving the eyepiece back and forth along the optical axis, for the purpose of adjusting the diopter. To this end, however, the configuration of the eyepiece should be cylindrical, resulting in an increase in size of an optical system. This may be a considerable sacrifice for a camera in which the reduction in size thereof is one of the important requirements.

SUMMARY OF THE INVENTION

It is an object of the present invention to avoid the shortcomings encountered with the conventional interchangeable-finder type single lens reflex cameras, that is to say, the increase in size of a camera due to a need to adjust the diopter. According to the present invention, an eyepiece holder is mounted within the finder and slidable along the optical axis of the eyepiece, and the aforenoted eyepiece holder is cooperative with a diopter-adjusting-operating member positioned in a concealed condition from the exterior of a camera.

BRIEF DESCRIPTION OF THE DRAWINGS

The finder-interchangeble type single lens reflex camera according to the present invention will now be described in more detail with reference to the accompanying drawings in which.

DETAILED DESCRIPTION OF THE INVENTION

Figure 1:
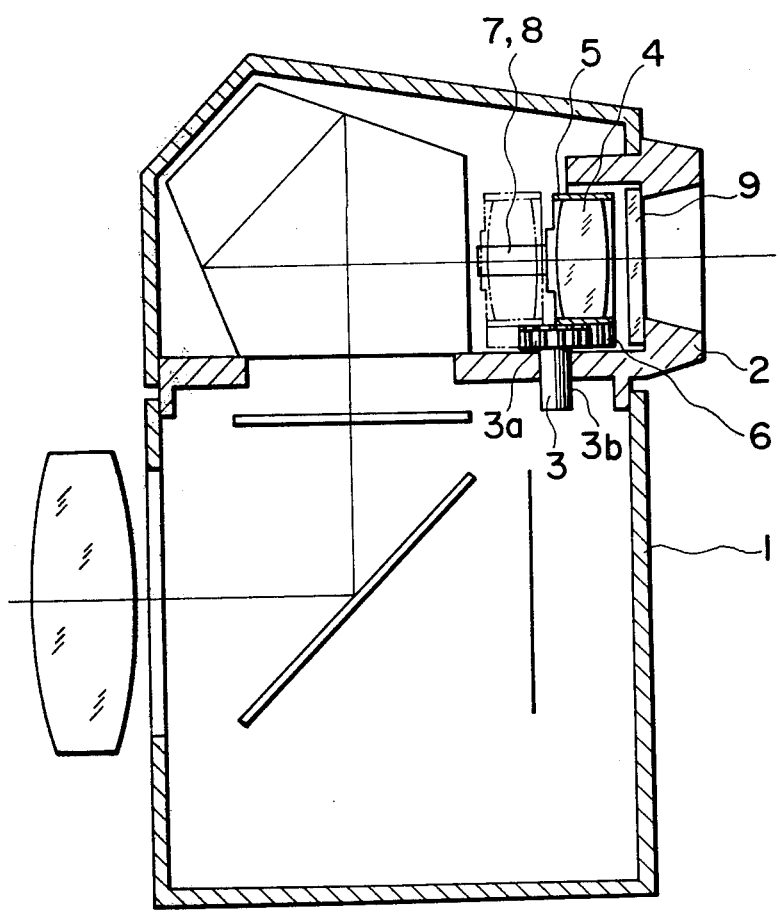
FIG. 1 is a cross-sectional view of an interchangeable-finder type single lens reflex camera incorporating a diopter-adjusting device according to the present invention.

FIG. 1 is a cross-sectional view of an interchangeable-finder type single reflex camera incorporating a diopter-adjusting device according to the present invention. A diopter-adjusting-operating member 3 is located in such a position that the member 3 may be concealed from the exterior of a camera body 1 when a finder supporting member 2 is mounted on a camera body 1. One end portion of the diopter-adjusting-operating member 3 is provided with a pinion gear 3a. The pinion gear 3a meshes with a rack 6 secured to an eyepiece holder 5 which rigidly holds an eyepiece 4 thereon. Thus, when such a portion of the diopter-adjusting-operating member 3, which is exposed from the finder supporting member 2, is rotated, the eyepiece holder 5 may slide on guide pins 7, 8 secured to the finder supporting member 2 and the leftward and rightward movements of the eyepiece holder 5, as viewed in the drawing, allow the adjustment of the diopter. Shown at 9 is a protective glass. In FIG. 1, the rotation of the operating member 3 is transmitted through the medium of the pinion and rack to the eyepiece holder so as to slide the latter. Alternatively, however, an operating member may be rigidly provided on the eyepiece holder so as to be directly slidingly operated for adjustment of the diopter. In addition, some frictional or clicking action may be required for adjusting the diopter; however, this problem has been suitably solved by various known techniques, and no description thereof is necessary herein.

Figure 2:
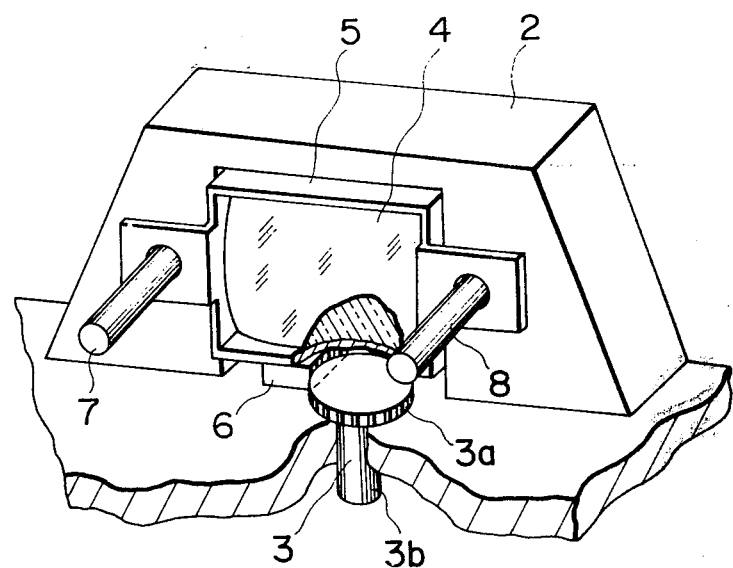
FIG. 2 and FIG. 3 are perspective views from inside the camera illustrative of the operation of the diopter-adjusting device of FIG. 1.
Figure 3:
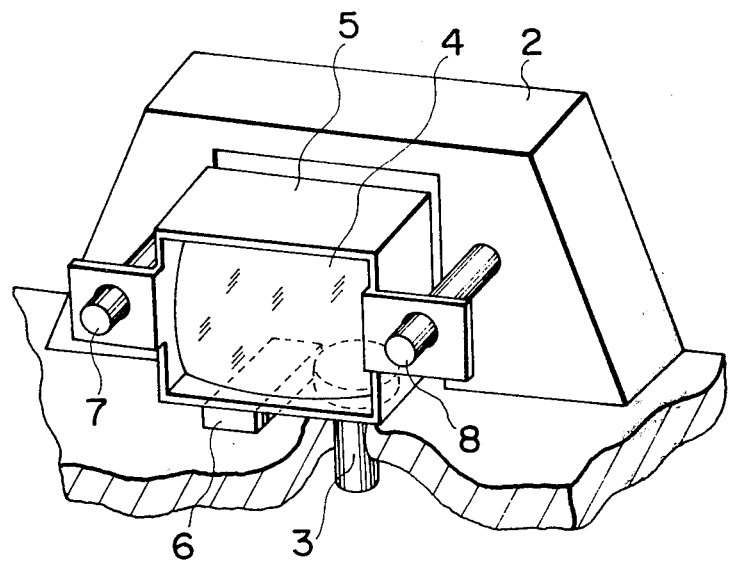

FIGS. 2 and 3 are perspective views from inside the camera illustrative of the operating condition of a diopter-adjusting device.

FIG. 2 refers to the case where the operating member 3 is rotated clockwise to its full extent, for bringing the eyepiece 4 in the closest vicinity of the protective glass 9, so that the diopter is adjusted to the extremity in a positive direction. FIG. 3 refers to the case where, unlike the case of FIG. 2, the eyepiece 4 is positioned as far away from the protective glass 9 as possible, so that the diopter is adjusted to the extremity in a negative direction. As is apparent from the foregoing, according to the present invention, the diopter-adjusting device is positioned so as to be able to clearly observe an image surface without impairing esthetics of appearance of camera and, in addition, a picture may be taken with no danger of the diopter-adjusting-operating member being moved inadvertently, either upon taking a picture or during handling of the camera.

What is claimed is:

1. A diopter adjusting device in an interchangeable-finder type single lens reflex camera for adjusting the position of an eyepiece along the optical axis thereof, the improvement characterized in that said adjusting device comprises:

an eyepiece holder for holding said eyepiece and slidably mounted within said finder along the optical axis of said eyepiece; and an operating means for sliding said eyepiece holder, said operating means being concealed from the exterior of said camera when said finder is mounted on said camera.

2. An adjusting device according to claim 1, wherein said operating means comprises:

a plurality of first projections on said eyepiece holder aligned in the direction of said optical axis; and a rotatable element having one or more second projections on its periphery for engaging said first projections so that rotation of said rotatable element will cause axial movement of said eyepiece.

* * * * *